(12) United States Patent
Takachi

(10) Patent No.: US 8,016,705 B2
(45) Date of Patent: Sep. 13, 2011

(54) BICYCLE COMPONENT POSITIONING DEVICE

(75) Inventor: Takeshi Takachi, Kawachinagano (JP)

(73) Assignee: Shimano Inc., Osaka (JP)

( * ) Notice: Subject to any disclaimer, the term of this patent is extended or adjusted under 35 U.S.C. 154(b) by 601 days.

(21) Appl. No.: 11/737,237

(22) Filed: Apr. 19, 2007

(65) Prior Publication Data

US 2008/0257089 A1    Oct. 23, 2008

(51) Int. Cl.
- F16H 59/02 (2006.01)
- F16H 9/00 (2006.01)
- F16H 61/00 (2006.01)
- F16H 63/00 (2006.01)
- G05G 1/00 (2008.04)

(52) U.S. Cl. ............. 474/80; 474/82; 74/469; 74/502.2; 74/527; 74/567

(58) Field of Classification Search .................... 474/80, 474/82; 74/469, 502.2, 527–538, 567–569
See application file for complete search history.

(56) References Cited

U.S. PATENT DOCUMENTS

| | | | |
|---|---|---|---|
| 4,384,864 A | 5/1983 | Bonnard | |
| 4,861,320 A * | 8/1989 | Nagano | 474/80 |
| 5,012,692 A | 5/1991 | Nagano | |
| 5,044,213 A | 9/1991 | Nagano | |
| 5,095,768 A | 3/1992 | Nagano | |
| 5,102,372 A | 4/1992 | Patterson et al. | |
| 5,222,412 A | 6/1993 | Nagano | |
| 5,588,331 A | 12/1996 | Huang et al. | |
| 5,666,859 A | 9/1997 | Arbeiter et al. | |
| 5,730,030 A | 3/1998 | Masui | |
| 5,755,139 A | 5/1998 | Kojima | |
| 5,799,542 A | 9/1998 | Yamane | |
| 5,921,139 A | 7/1999 | Yamane | |
| 6,066,057 A | 5/2000 | Nakamura et al. | |
| 6,135,906 A | 10/2000 | Ichida | |
| 6,145,407 A | 11/2000 | Rottmann | |
| 6,264,576 B1 * | 7/2001 | Lien | 474/80 |
| 6,467,368 B1 | 10/2002 | Feng et al. | |
| 6,553,860 B2 | 4/2003 | Blaschke | |
| 6,810,764 B2 | 11/2004 | Chen | |
| 6,862,948 B1 | 3/2005 | Calendrille, Jr. | |
| 6,877,393 B2 | 4/2005 | Takachi | |
| 6,993,995 B2 | 2/2006 | Fujii | |
| 7,153,589 B1 | 12/2006 | Sato et al. | |
| 2002/0025868 A1 * | 2/2002 | Fukuda | 474/70 |

(Continued)

FOREIGN PATENT DOCUMENTS

EP    0 013 647 A1    7/1980

(Continued)

Primary Examiner — Michael Mansen
Assistant Examiner — Robert Reese
(74) Attorney, Agent, or Firm — Global IP Counselors, LLP

(57) ABSTRACT

A bicycle component positioning device is basically provided with a fixed structure, an input member and a positioning member. The input member is movably coupled relative to the fixed structure. The input member has a first moving direction and a second moving direction. The positioning member is operatively coupled to the input mechanism to selectively move between a plurality of predetermined positions. The input member and the positioning member are configured and arranged relative to each other such that the positioning member is initially moved by the input member in a direction different from the first and second moving directions in response to movement of the input member both in the first moving direction and in the second moving direction.

13 Claims, 12 Drawing Sheets

U.S. PATENT DOCUMENTS

| | | | |
|---|---|---|---|
| 2002/0112559 A1 | 8/2002 | Liu | |
| 2002/0144566 A1 | 10/2002 | Liu et al. | |
| 2004/0005947 A1* | 1/2004 | Shahana et al. | 474/78 |
| 2004/0005950 A1* | 1/2004 | Tetsuka et al. | 474/80 |
| 2004/0043850 A1* | 3/2004 | Ichida et al. | 474/70 |
| 2005/0034554 A1 | 2/2005 | Hou | |
| 2005/0193856 A1 | 9/2005 | Dal Pra et al. | |
| 2006/0053941 A1 | 3/2006 | Dal Pra et al. | |
| 2006/0058134 A1* | 3/2006 | Mercat et al. | 474/80 |
| 2006/0070484 A1* | 4/2006 | Kawakami | 74/527 |
| 2006/0096404 A1* | 5/2006 | Wessel et al. | 74/501.6 |
| 2006/0130602 A1 | 6/2006 | Kawakami | |
| 2006/0207375 A1 | 9/2006 | Jordan et al. | |
| 2006/0260427 A1 | 11/2006 | Tsumiyama | |
| 2007/0017316 A1 | 1/2007 | Tsumiyama | |

FOREIGN PATENT DOCUMENTS

| | | |
|---|---|---|
| FR | 2 621 372 A1 | 7/1989 |
| JP | 48-37835 | 6/1973 |
| JP | 51-18046 | 2/1976 |
| JP | 51-28934 | 3/1976 |
| JP | 51-43541 | 4/1976 |
| JP | 51-50141 | 5/1976 |
| JP | 52-15033 | 2/1977 |
| JP | 53-98644 | 8/1978 |
| JP | 54-15241 | 2/1979 |
| JP | 55-25693 | 2/1980 |

* cited by examiner

BICYCLE COMPONENT POSITIONING DEVICE

BACKGROUND OF THE INVENTION

1. Field of the Invention

This invention generally relates to a bicycle component positioning device. More specifically, the present invention relates to a bicycle component positioning device for a bicycle component such as a derailleur or shifter, which has the same relatively easy action when moved in two opposite directions, yet is reliably retained.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle such as derailleurs and shifters.

A bicycle derailleur basically includes a base, a chain guide and a linkage coupled between the base and the chain guide to move the chain guide between various shift positions. The base is fixed to the bicycle frame. A spring is arranged to bias the chain guide in one lateral direction relative to the base. A control cable is used to move the chain guide against the biasing force of the spring when pulled, and to allow the bias force of the spring to move the chain guide in an opposite direction when the cable is released. A shifter is attached to the cable to selectively pull/release the cable to move the chain guide laterally back and forth respectively. With these conventional derailleurs, shifting is not always as smooth and reliable as desired by some riders. Moreover, the control cable is always held in tension by the spring, which leads to continued cable stretching. Continued cable stretching leads to frequent adjustment of the derailleur and/or shifter or minor misalignment of the derailleur. Furthermore, conventional derailleurs can be relatively complicated and expensive to manufacture, assemble, to mount to the bicycle and/or adjust.

The shifter typically utilizes one or more levers coupled to a winding member to selectively pull/release the cable for controlling a conventional derailleur. The winding member is retained in various shift positions by a retaining structure, friction or the like. Optionally, some shifters further include an indexing mechanism with a plurality of positions corresponding to the number of shift positions. In any case, a sufficient retaining force must be applied to the winding member to prevent undesired movement of the chain guide of the derailleur due to the biasing force of the derailleur spring. Thus, a relatively strong retaining force must be provided, which can be relatively difficult to overcome when moving the lever(s). Additionally, when the shifting device is actuated to wind the cable, an even stronger force is often required than during an unwinding operating due to the derailleur biasing member. In either case, the shifting action(s) may feel awkward to some individuals. Also, with these conventional shifters, shifting is not always as smooth and reliable as desired by some riders. Moreover, conventional shifters can be relatively complicated and expensive to manufacture, assemble, to mount to the bicycle and/or adjust.

In view of the above, it will be apparent to those skilled in the art from this disclosure that there exists a need for an improved bicycle component positioning device. This invention addresses this need in the art as well as other needs, which will become apparent to those skilled in the art from this disclosure.

SUMMARY OF THE INVENTION

One object of the present invention is to provide a bicycle component positioning device, which moves smoothly and reliably, yet is reliably retained in different positions.

Another object of the present invention is to provide a bicycle component positioning device, which has a similar relatively light action when moved in opposite directions.

Another object of the present invention is to provide a bicycle component positioning device, which is relatively simple and inexpensive to manufacture and/or assemble.

The foregoing objects can basically be attained by providing a bicycle component positioning device, which basically comprises a fixed structure, an input member and a positioning member. The input member is movably coupled relative to the fixed structure. The input member has a first moving direction and a second moving direction. The positioning member is operatively coupled to the input member to selectively move between a plurality of predetermined positions. The input member and the positioning member are configured and arranged relative to each other such that the positioning member is initially moved by the input member in a direction different from the first and second moving directions in response to movement of the input member both in the first moving direction and in the second moving direction.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
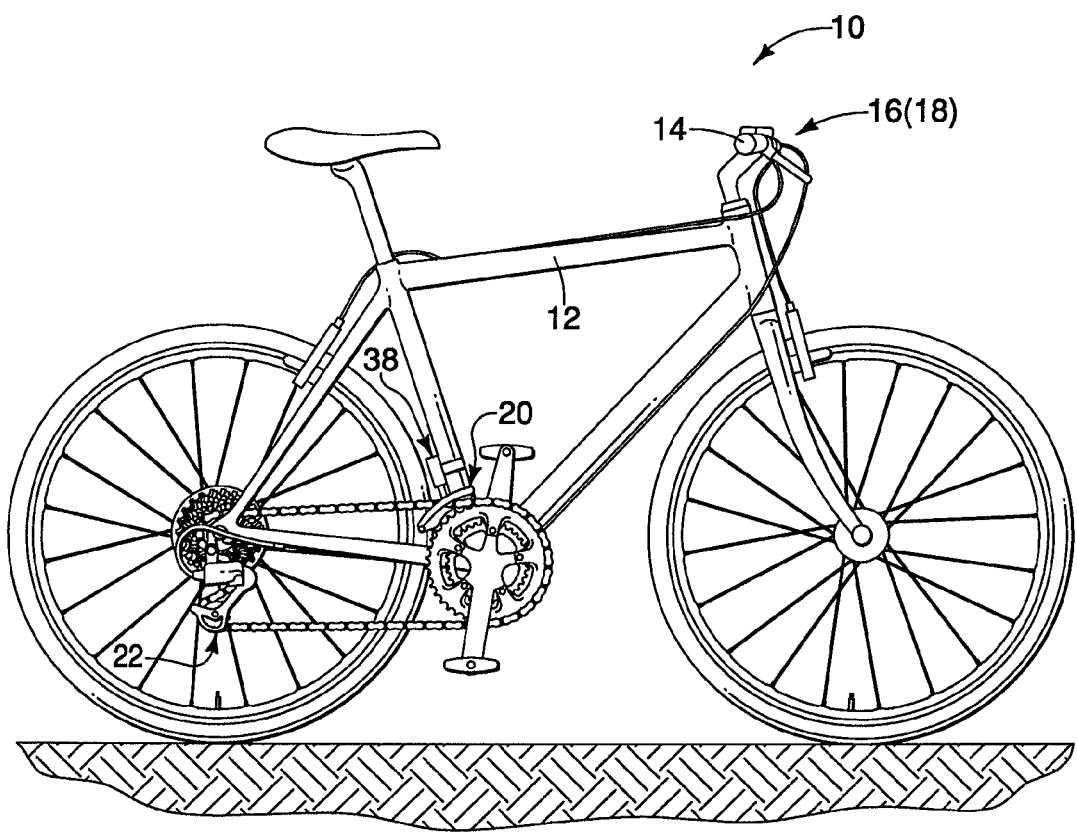
FIG. 1 is a side elevational view of a bicycle equipped with front and rear shifting systems in accordance with the present invention.
Figure 2:
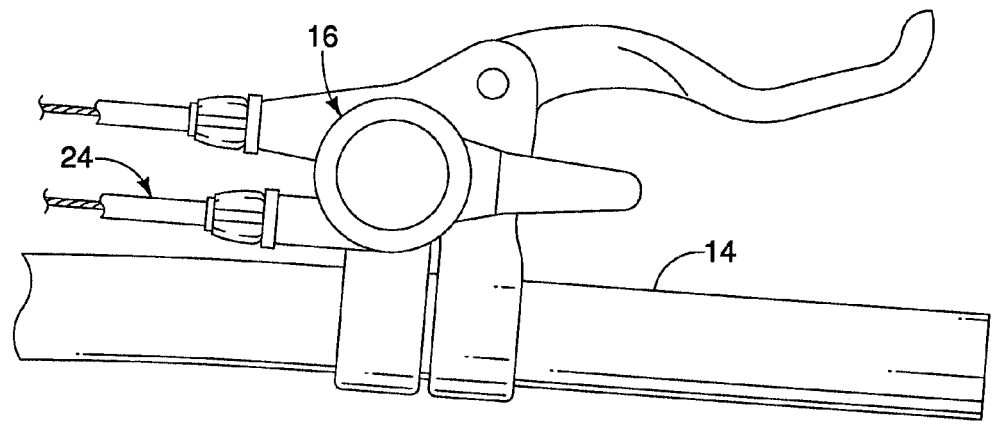
FIG. 2 is a top plan view of a right side shifter for one of the shifting systems illustrated in FIG. 1.
Figure 3:
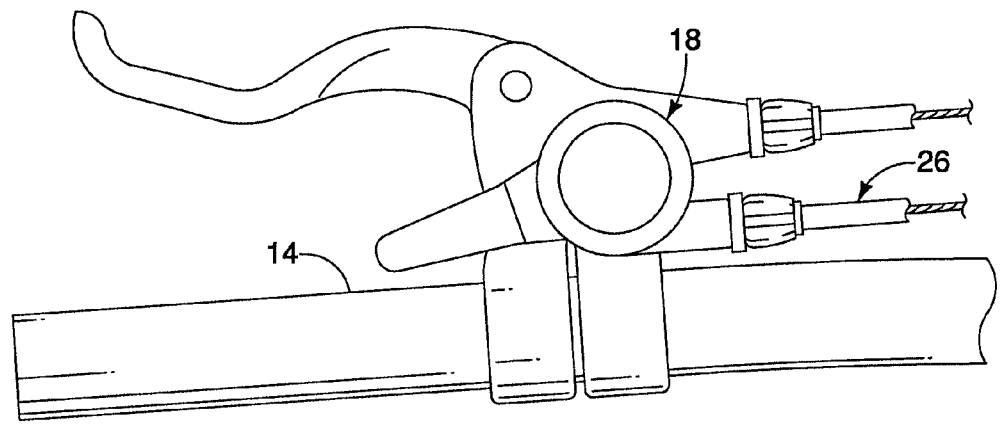
FIG. 3 is a top plan view of a left side shifter for one of the shifting systems illustrated in FIG. 1.

Referring initially to FIGS. 1-3, a bicycle 10 is illustrated with a front shifting system and a rear shifting system coupled thereto in accordance with the present invention. The bicycle 10 includes, among other things, a frame 12 with a handle bar 14. The handle bar 14 has a right-hand shifter 16 mounted on a right-hand side and a left-hand shifter 18 mounted on a right-hand side. The frame 12 has a front derailleur 20 mounted to the seat tube and a rear derailleur 22 mounted a rear part of the chain stay. The right-hand shifter 16 is operatively coupled to one of the front derailleur 20 and the rear derailleur 22 by a first control cable 24, while the left hand shifter 18 is operatively coupled to the other of the front derailleur 20 and the rear derailleur 22 by a second control cable 26.

Now referring to FIGS. 4 to 13, the front derailleur 20 basically includes a base member 30, a movable member 32 supporting a chain guide 34, a linkage mechanism 36 and a positioning device 38. The front derailleur 20 is basically a conventional front derailleur, except for the addition of the positioning device 38 that is operated by one of the shifters 16 and 18. Thus, the front derailleur 20 will only not be discussed and/or illustrated in detail. Basically, the base member 30 is attachable to the seat tube of the bicycle frame 12 in a conventional manner. For example, the base member 30 is preferably a band clamp. However, other mounting arrangements are possible. Fore example, the base member 30 can be attached to braze-on connections or mounted to the bottom bracket, if needed and/or desired. The movable member 32 is pivotally attached to the linkage mechanism 36 to support the chain guide 34 for laterally movement between an innermost or retracted position to an outermost or extended position with respect to the frame 12. The linkage mechanism 36 is arranged between the base member 30 and the movable member 32 to create a four-bar linkage with the base member 30 and the movable member 32 so that the chain guide 34 moves laterally relative to the base member 30. Thus, the chain guide 34 serves as an output member that is operatively coupled to the positioning device 38 to move in response to movement of the positioning device 38 due to operation of one of the shifters 16 and 18.

While the positioning device 38 is illustrated as part of the front derailleur 20, it will be apparent to those skilled in the art that the positioning device 38 of the present invention can be adapted to the rear derailleur 22. Thus, the positioning device of the rear derailleur 22 will not be discussed and/illustrated in detail.

The positioning device 38 is coupled to a link 36a of the linkage mechanism 36 for moving the linkage mechanism 36 between the innermost or retracted position to the outermost or extended position with respect to the frame 12. Thus, the positioning device 38 firmly positions the chain guide 34 in one of a plurality of operating positions. The positioning device 38 basically includes a housing or fixed structure 40, an input or operating member 42, a positioning member 44 and a plurality of biasing members 46, 48 and 50.

The housing or fixed structure 40 is fixed with respect to the bicycle frame 12. The housing or fixed structure 40 can be fixed to the base member 30 or directly fixed to the bicycle frame 12. The precise structure of the housing or fixed structure 40 can take any necessary configuration to carry out the present invention. The housing or fixed structure 40 is preferably construction of a rigid and lightweight material. The fixed structure 40 houses the input member 42 and positioning member 44. The fixed structure 40 includes a plurality of positioning detents 40a that selectively engages the positioning member 44 to restrict movement of the positioning member 44 when the input member 42 is a rest position as explained below.

The input member 42 is coupled to the fixed structure 40 to move back and forth along an operating plane in a first moving direction A and in a second moving direction B that is opposite to the first moving direction A. While the operating plane is illustrated as a flat plane, it will be apparent to those skilled in the art from this disclosure that the operating plane can be a curved plane. Thus, the term "operating plane" as used herein is not limited to a flat plane. The input member 42 is a cable operated member that is operated by one of the shifters 16 and 18 via one of the control cables 24 and 26 (e.g., derailleur operating members). In particular, the input member 42 includes a cable attachment structure 42a for operatively connecting one of the control cables 24 and 26 thereto. The control cables 24 and 26 are relative rigid cables in a longitudinal direction and relatively flexible in a transverse direction so that the control cables 24 and 26 can transmit a pushing force and a pull force between one of the shifters 16 and 18 and one of the derailleurs 20 and 22. Alternatively, the input member 42 can be operatively connected to one of the shifters 16 and 18 by a pair of cables such that one of the cables pulls the input member 42 in the first moving direction A and the other one of the cables pulls the input member 42 in the second moving direction B. Furthermore, the input member 42 can alternatively be operatively connected to a hydraulic or pneumatic operated shifter. In other words, the present invention can be used with a hydraulic actuating system or a pneumatic actuating system instead of a cable operated system. Thus, hydraulic or pneumatic lines constitute derailleur operating members that can operatively connect the input member 42 to one of the shifters 16 and 18.

Figure 5:
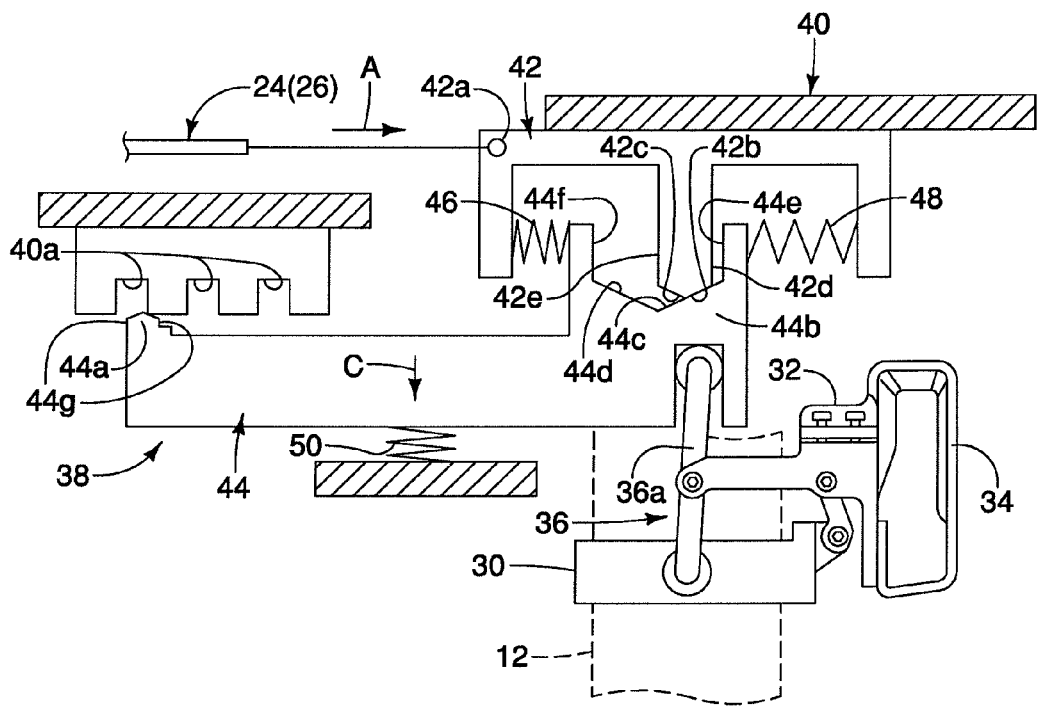
FIG. 5 is a simplified schematic view of the bicycle component positioning device illustrated in FIG. 4, but with the input member being pushed (shifted in a first moving direction) from the rest (innermost) position of FIG. 4 to an intermediate or partially shifted position.
Figure 6:
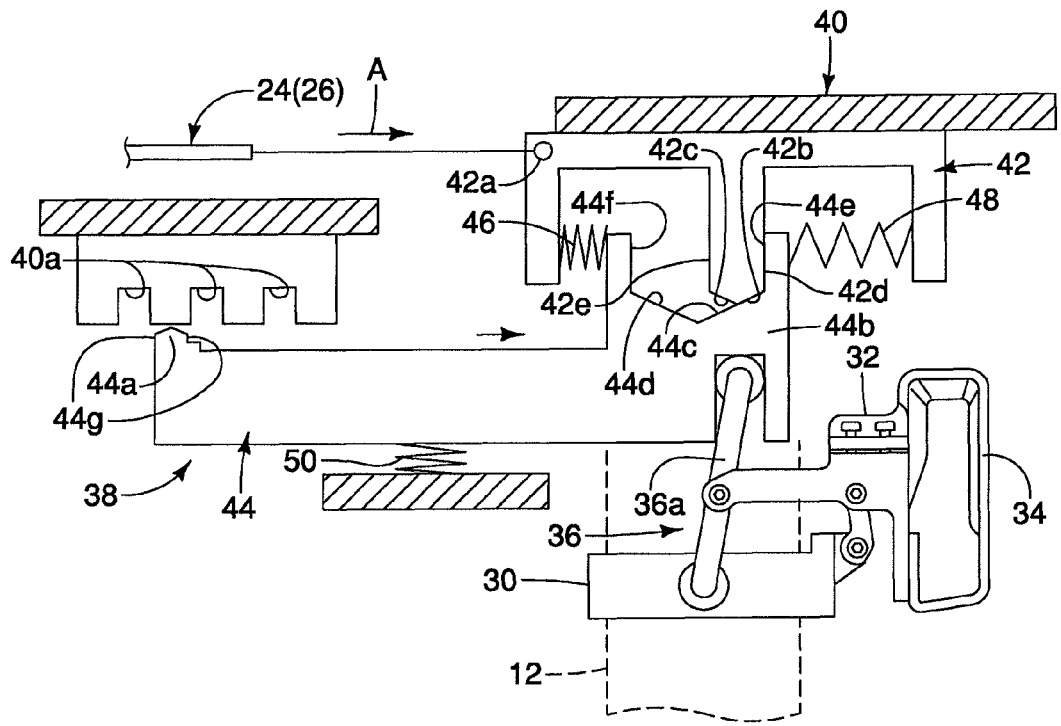
FIG. 6 is a simplified schematic view of the bicycle component positioning device illustrated in FIGS. 4 and 5, but with the input member being pushed (shifted in the first moving direction) further from the intermediate or partially shifted position of FIG. 5 such that the positioning member is moved completely out of the first detent.
Figure 10:
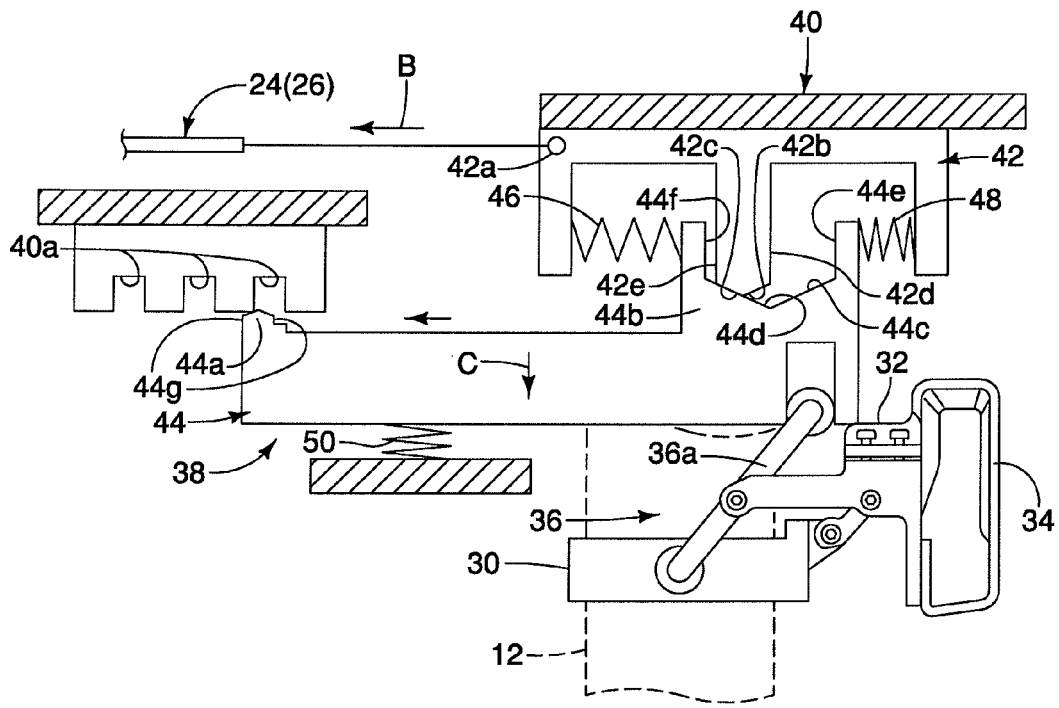
FIG. 10 is a simplified schematic view of the bicycle component positioning device illustrated in FIGS. 4 to 9, but with the input member being pulled (shifted in a second moving direction) from the rest (outermost) position of FIG. 9 to an intermediate or partially shifted position.
Figure 11:
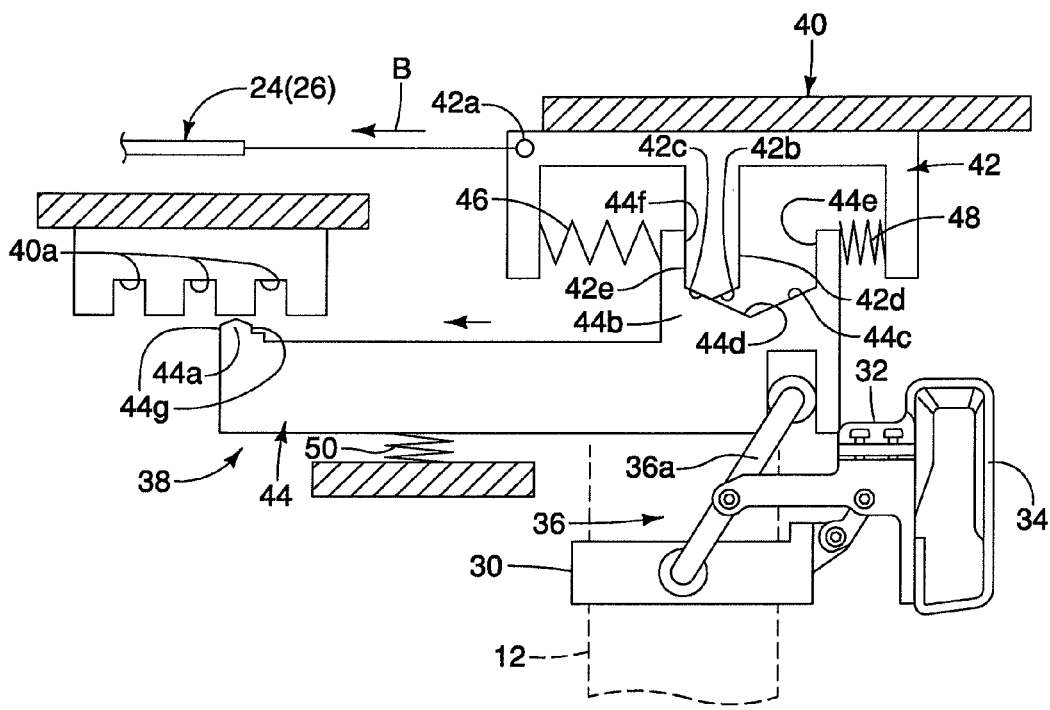
FIG. 11 is a simplified schematic view of the bicycle component positioning device illustrated in FIGS. 4 to 10, but with the input member being pulled (shifted in the second moving direction) further from the intermediate or partially shifted position of FIG. 10 such that the positioning member is moved completely out of the third detent.

The input member 42 further includes a cam member with a first contact surface 42b, a second contact surface 42c, a third contact surface 42d and a fourth contact surface 42e. The first and second contact surfaces 42b and 42c are slanted surfaces that meet together at a point such that the first and second contact surfaces 42b and 42c are angled in opposite directions. The first contact surface 42b is configured and arranged relative to the positioning member 44 to initially move the positioning member 44 in a third (transverse) direction C, as seen in FIG. 5, when the input member 42 is moved in the first moving direction A, as seen in FIG. 5. The second contact surface 42c is configured and arranged relative to the positioning member 44 to initially move the positioning member 44 in the third (transverse) direction C, as seen in FIG. 10, when the input member 42 is moved in the second moving direction B, as seen in FIG. 10. The third and fourth contact surfaces 42d and 42e are parallel surfaces that face in opposite directions and extend from the first and second contact surfaces 42b and 42c, respectively. The third contact surface 42d is configured and arranged relative to the positioning member 44 to contact the positioning member 44 and then move the positioning member 44 in the first moving direction A after the positioning member 44 has been disengaged from the positioning detents 40a of the fixed structure 40 when the input member 42 is moved in the first moving direction A, as seen in FIGS. 5 and 6. Similarly, the fourth contact surface 42e is configured and arranged relative to the positioning member 44 to contact the positioning member 44 and then move the positioning member 44 in the second moving direction B after the positioning member 44 has been disengaged from the positioning detents 40a of the fixed structure 40 when the input member 42 is moved in the second moving direction B, as seen in FIGS. 10 and 11.

Figure 4:
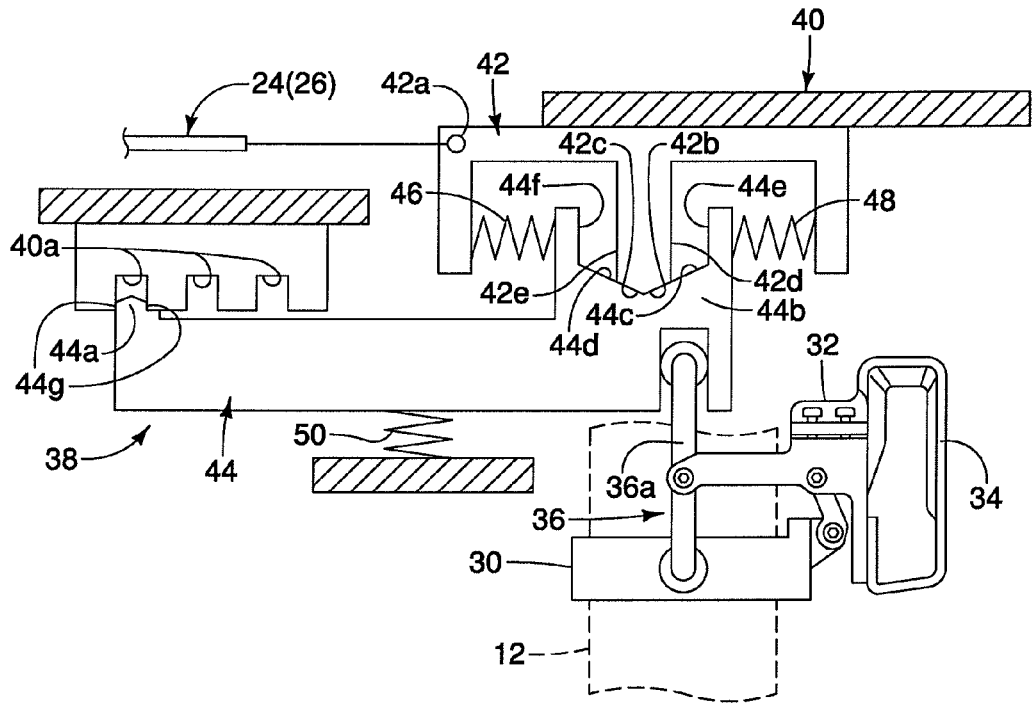
FIG. 4 is a simplified schematic view of the bicycle component positioning device in a rest (innermost) position where the bicycle component positioning device is incorporated into a front derailleur and in which the positioning member is engaged with a first detent.
Figure 9:
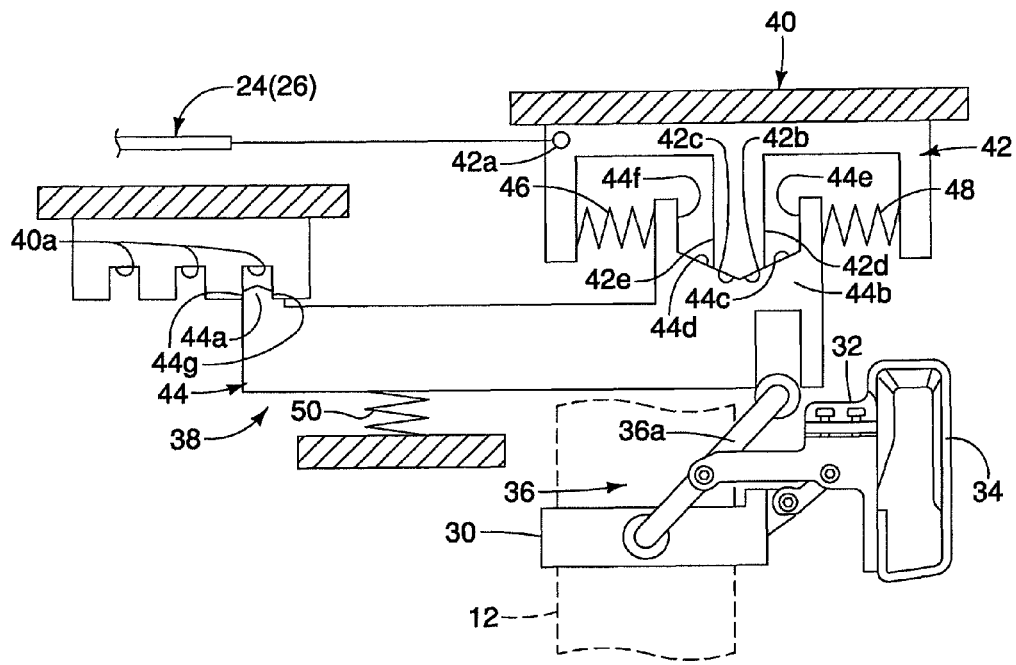
FIG. 9 is a simplified schematic view of the bicycle component positioning device illustrated in FIGS. 4 to 8, but in a rest (outermost) position in which the positioning member is engaged with a third detent.

Thus, the first and third contact surfaces 42b and 42d are arranged to contact the positioning member with the first contact surface 42b initially moving the positioning member 44 in the third direction C and the third contact surface subsequently moving the positioning member 44 in the first moving direction A in response to the first progressive movement of the input member 44 in the first moving direction A, as seen in FIGS. 4 to 6. In FIG. 5, the positioning member 44 is moved in both of the first and third directions A and C by the first contact surface 42b, but the positioning member 44 is initially moved in the third direction C due to engagement of the positioning member 44 against the fixed structure 40 as explained below. The second and fourth contact surfaces 42c and 42e are arranged to contact the positioning member 44 with the second contact surface 42c initially moving the positioning member 44 in the third direction C and the fourth contact surface 42e subsequently moving the positioning member 44 in the second moving direction B in response to the second progressive movement of the input member 42 in the second moving direction B, as seen in FIGS. 9 to 11. In FIG. 10, the positioning member 44 is moved in both of the second and third directions B and C by the second contact surface 42c, but the positioning member 44 is initially moved in the third direction C due to engagement of the positioning member 44 against the fixed structure 40 as explained below.

The input member 42 is biased to a center rest position with respect to the positioning member 44 such that the input member 42 is movable in both of the first and second moving directions A and B from the rest position. In particular, the biasing members 46 and 48 are arranged between the input member 42 and the positioning member 44 to normally maintain the input member 42 in a rest position. While the biasing members 46 and 48 are illustrated as coiled compression springs, it will be apparent to those skilled in the art from this disclosure that other biasing arrangements can be utilized if needed and/or desired.

The positioning member 44 is operatively coupled to the input member 42 to selectively move between a plurality of predetermined positions in response to movement of the input member 42. In particular, the positioning member 44 includes a movement restricting part 44a and an input transmitting part 44b. The movement restricting part 44a of the positioning member 44 selectively engages the positioning detents 40a to restrict movement of the positioning member 44 in both the first and second moving directions A and B when the input member 42 is the rest position without a force being applied to the input member 42. The movement restricting part 44a of the positioning member 44 is normally biased into engagement with one of the positioning detents 40a by the biasing member 50.

The input transmitting part 44b of the positioning member 44 cooperates with the contact surfaces 42b, 42c, 42d and 42e of the input member 42 and the fixed structure 40 so the positioning member 44 moves in response to movement of the input member 42. In particular, the input transmitting part 44b includes a first cam surface 44c, a second cam surface 44d, a first abutment surface 44e, a second abutment surface 44f and a pair of inclined surfaces 44g. The first cam surface 44c extends in the first moving direction A from a resting point. The second cam surface 44d extends in the second moving direction B from the resting point. The first abutment surface 44e faces in the second moving direction B. The second abutment surface 44f faces in the first moving direction A. The inclined surfaces 44g are formed on the free end of the movement restricting part 44a.

Figure 7:
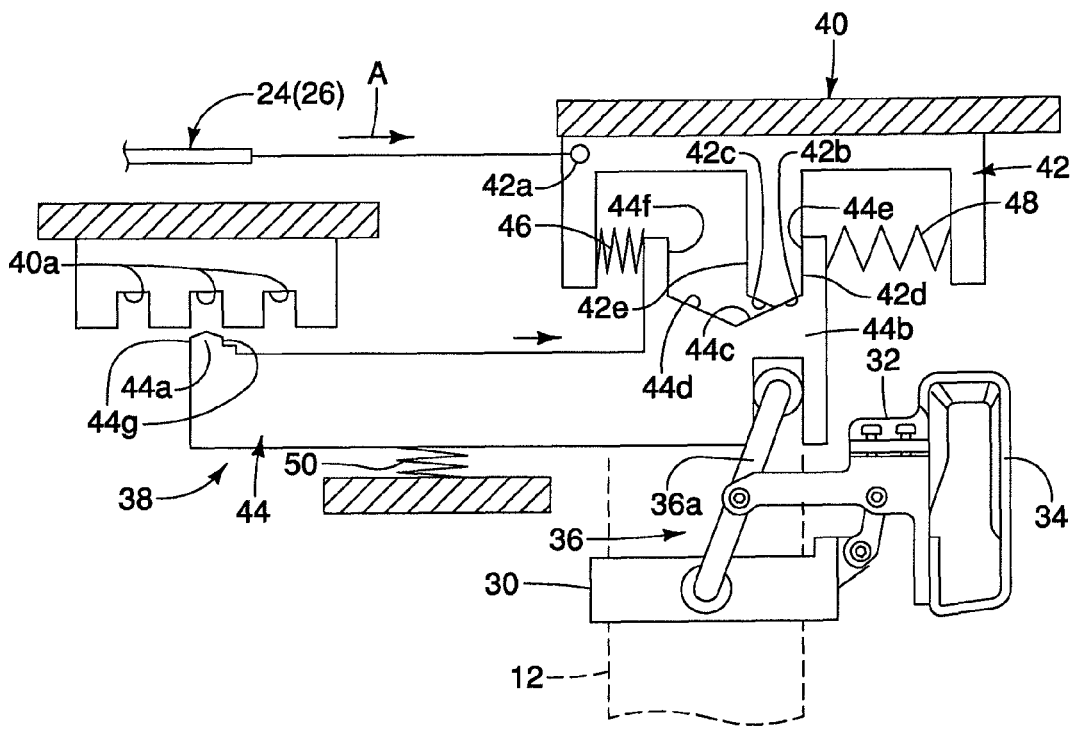
FIG. 7 is a simplified schematic view of the bicycle component positioning device illustrated in FIGS. 4 to 6, but with the input member being pushed (shifted in the first moving direction) further from the intermediate or partially shifted position of FIG. 6 to an end position such that the positioning member is located at a second detent.
Figure 8:
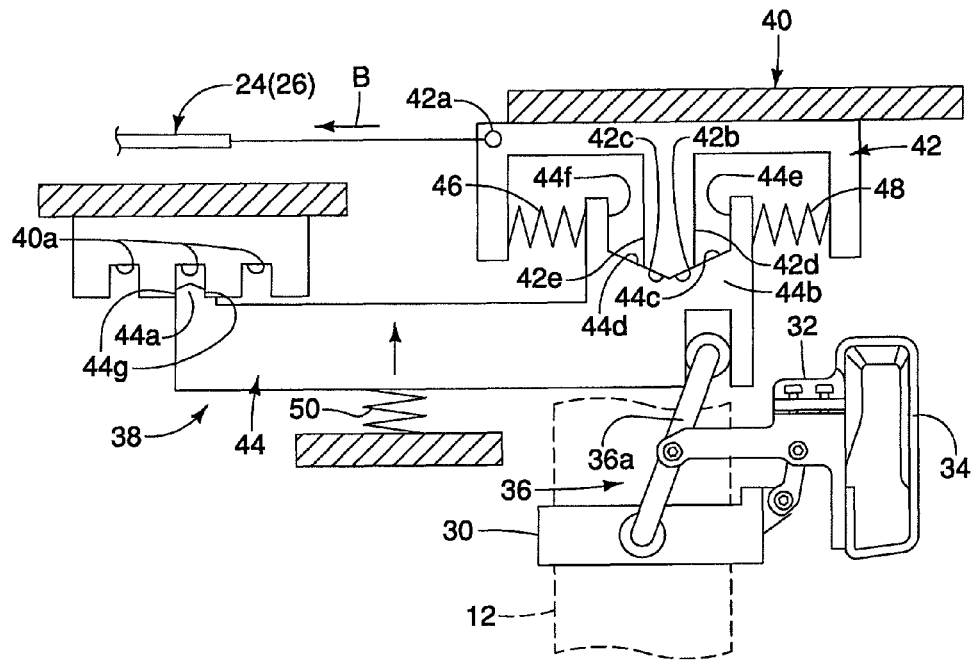
FIG. 8 is a simplified schematic view of the bicycle component positioning device illustrated in FIGS. 4 to 7, but with the input member being released so that the input member returns to a rest (middle) position and the positioning member engages the second detent.
Figure 12:
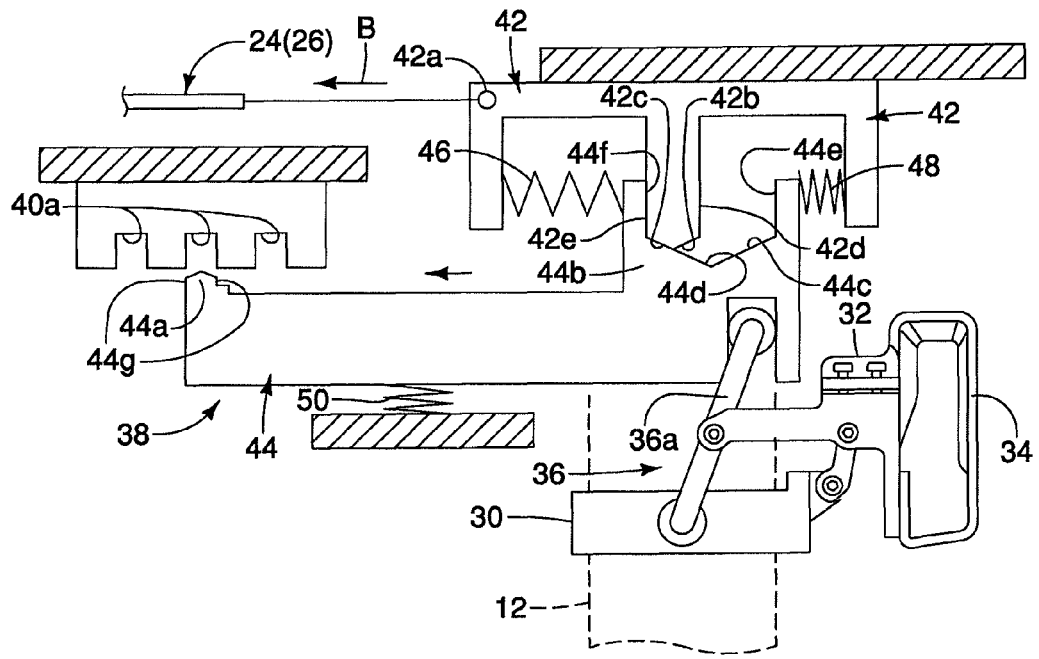
FIG. 12 is a simplified schematic view of the bicycle component positioning device illustrated in FIGS. 4 to 11, but with the input member being pulled (shifted in the second moving direction) further from the intermediate or partially shifted position of FIG. 11 to an end position such that the positioning member is located at the second detent.
Figure 13:
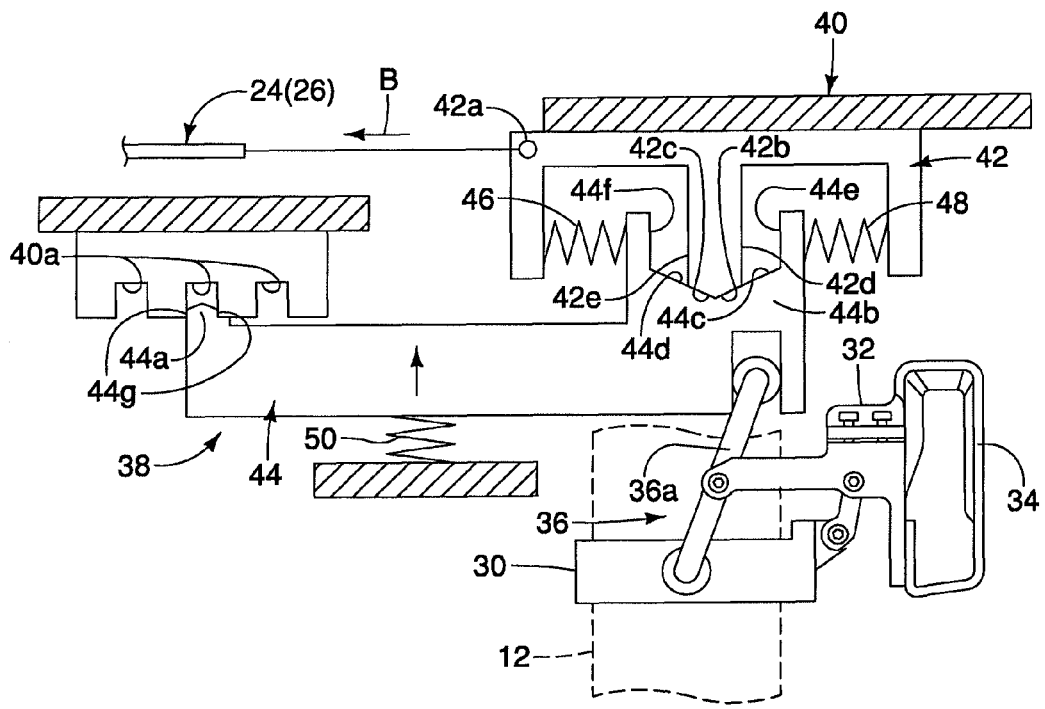
FIG. 13 is a simplified schematic view of the bicycle component positioning device illustrated in FIGS. 4 to 12, but with the input member being released so that the input member returns to a rest (middle) position and the positioning member engages the second detent.

As seen in FIG. 5, the positioning member 44 is moved in both of the first and third directions A and C. The first contact surface 42b of the input member 42 contacts the first cam surface 44c of the positioning member 44 and one of the inclined surfaces 44g contacts the fixed structure 40 to initially move the positioning member 44 in the third direction C. Then the third contact surface 42d of the input member 42 subsequently contacts the first abutment surface 44e of the positioning member 44 to move in the first moving direction A in response to the first progressive movement of the input member 42 in the first moving direction A as seen in FIGS. 6 and 7. As seen in FIG. 10, the second contact surface 42c of the input member 42 contacts the second cam surface 44d of the positioning member 44 and one of the inclined surfaces 44g contacts the fixed structure 40 to initially move the positioning member 44 in the third direction C. Then the fourth contact surface 42e of the input member 42 subsequently contacts the second abutment surface 44f of the positioning member 44 to move in the second moving direction B in response to the second progressive movement of the input member 42 in the second moving direction B as seen in FIGS. 11 and 12.

Now referring to FIGS. 14 to 23, the shifters 16 and 18 will now be discussed in accordance with another aspect of the present invention. Each of shifters 16 and 18 includes a positioning device 138 that is schematically illustrated in FIGS. 14 to 23. The positioning device 138 is illustrated as moving in a flat plane for purposes of illustration. However, in the illustrated in embodiment, the positioning device 138 operates in a curved plane about a central pivot axis. The positioning device 138 is operatively coupled to one of the derailleurs 20 and 22 via one of the cables 24 and 26 for moving a linkage mechanism one of the derailleurs 20 and 22 between the innermost or retracted position to the outermost or extended position with respect to the frame 12. Alternatively, a hydraulic actuating system or a pneumatic actuating system can be used to operate the derailleurs 20 and 22 instead the cables 24 and 26. The positioning device 138 basically includes a housing or fixed structure 140, an input member or operating lever 142, a positioning member 144 and a plurality of biasing members 146, 148 and 150.

The housing or fixed structure 140 is fixed with respect to the bicycle frame 12. The precise structure of the housing or fixed structure 140 can take any necessary configuration to carry out the present invention. The housing or fixed structure 140 is preferably construction of a rigid and lightweight material. The fixed structure 140 houses the input member 142 and positioning member 144. The fixed structure 140 includes a plurality of positioning detents 140a that selectively engages the positioning member 144 to restrict movement of the positioning member 144 when the input member 142 is a rest position as explained below.

The input member 142 is coupled to the fixed structure 140 to move back and forth along a curved operating plane in a first curved direction A (first moving direction) and in a second curved direction B (second moving direction) that is opposite to the first curved direction A. The input member 142 is a rider operable member that extends outside of the fixed structure or housing 140.

Figure 15:
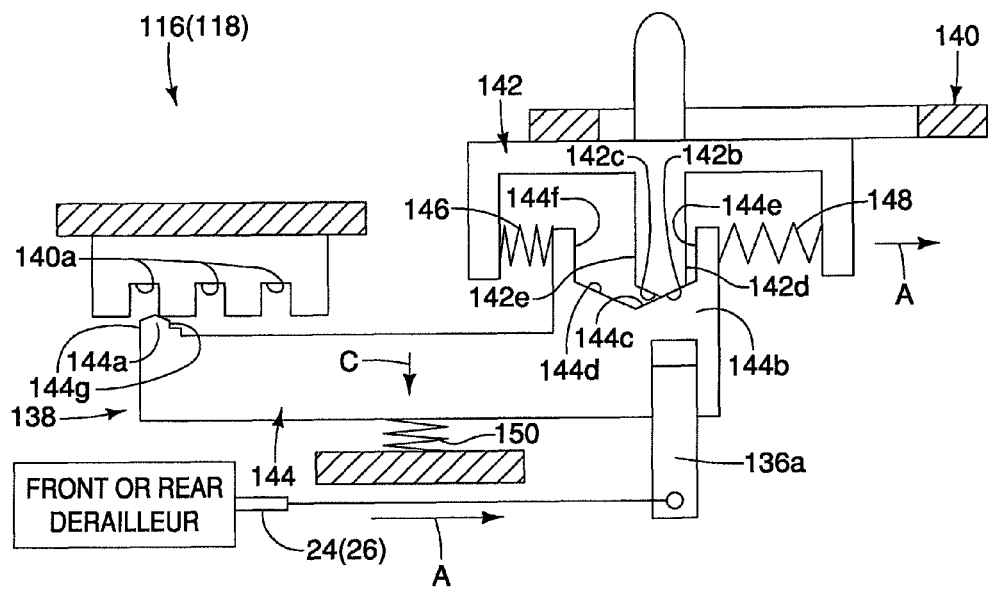
FIG. 15 is a simplified schematic view of the bicycle component positioning device illustrated in FIG. 14, but with the input member being pushed (shifted in a first moving direction) from the rest (innermost) position of FIG. 14 to an intermediate or partially shifted position.
Figure 16:
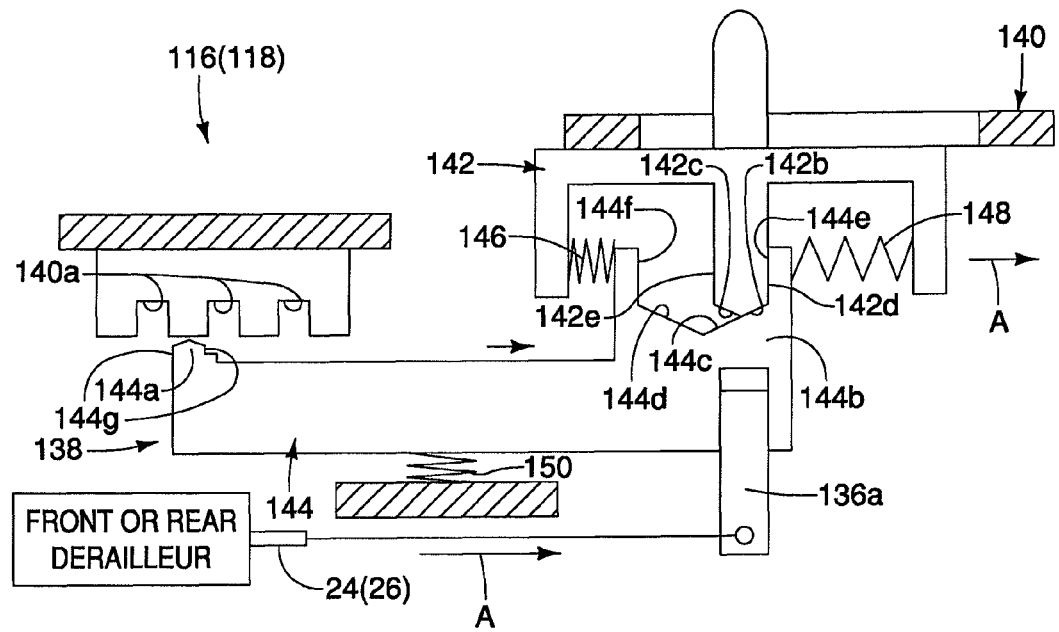
FIG. 16 is a simplified schematic view of the bicycle component positioning device illustrated in FIGS. 14 and 15, but with the input member being pushed (shifted in the first moving direction) further from the intermediate or partially shifted position of FIG. 15 such that the positioning member is moved completely out of the first detent.
Figure 20:
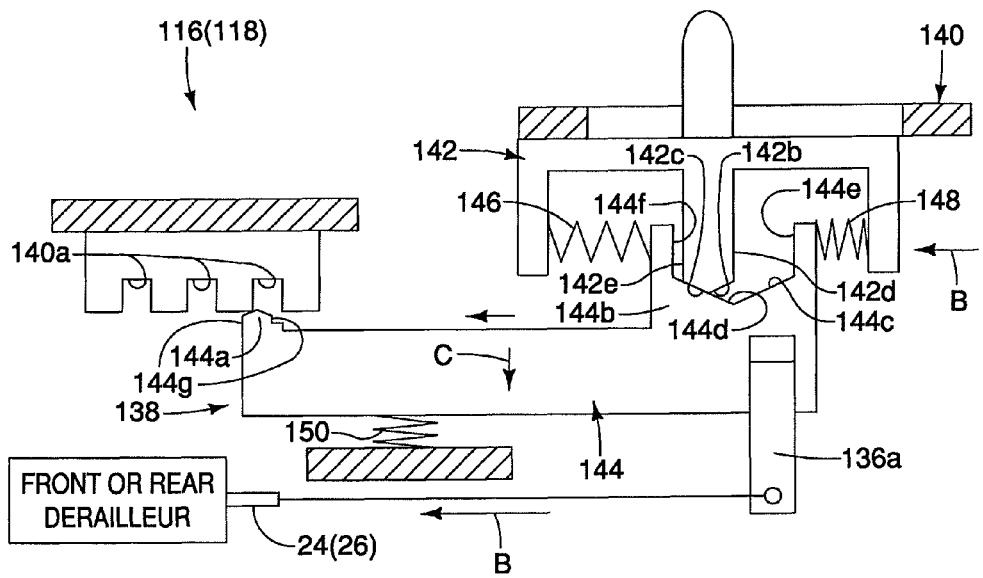
FIG. 20 is a simplified schematic view of the bicycle component positioning device illustrated in FIGS. 14 to 19, but with the input member being pulled (shifted in a second moving direction) from the rest (outermost) position of FIG. 19 to an intermediate or partially shifted position.
Figure 21:
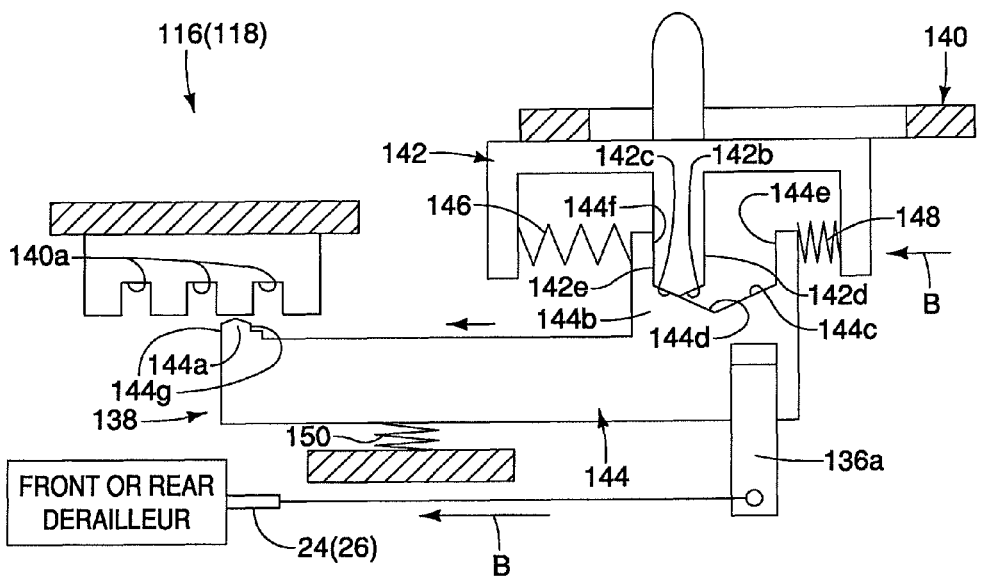
FIG. 21 is a simplified schematic view of the bicycle component positioning device illustrated in FIGS. 14 to 20, but with the input member being pulled (shifted in the second moving direction) further from the intermediate or partially shifted position of FIG. 20 such that the positioning member is moved completely out of the third detent.

The input member 142 further includes a cam member with a first contact surface 142b, a second contact surface 142c, a third contact surface 142d and a fourth contact surface 142e. The first and second contact surfaces 142b and 142c are slanted surfaces that meet together at a point such that the first and second contact surfaces 142b and 142c are angled in opposite directions. The first contact surface 142b is configured and arranged relative to the positioning member 144 to initially move the positioning member 144 in a third (transverse) direction C, as seen in FIG. 15, when the input member 142 is moved in the first curved direction A, as seen in FIG. 15. The second contact surface 142c is configured and arranged relative to the positioning member 144 to initially move the positioning member 144 in the third (transverse) direction C, as seen in FIG. 20, when the input member 142 is moved in the second curved direction B, as seen in FIG. 20. The third and fourth contact surfaces 142d and 142e are parallel surfaces that face in opposite directions and extend from the first and second contact surfaces 142b and 142c, respectively. The third contact surface 142d is configured and arranged relative to the positioning member 144 to contact the positioning member 144 and then move the positioning member 144 in the first curved direction A after the positioning member 144 has been disengaged from the positioning detents 140a of the fixed structure 140 when the input member 142 is moved in the first curved direction A, as seen in FIGS. 15 and 16. Similarly, the fourth contact surface 142e is configured and arranged relative to the positioning member 144 to contact the positioning member 144 and then move the positioning member 144 in the second curved direction B after the positioning member 144 has been disengaged from the positioning detents 140a of the fixed structure 140 when the input member 142 is moved in the second curved direction B, as seen in FIGS. 20 and 21.

Figure 14:
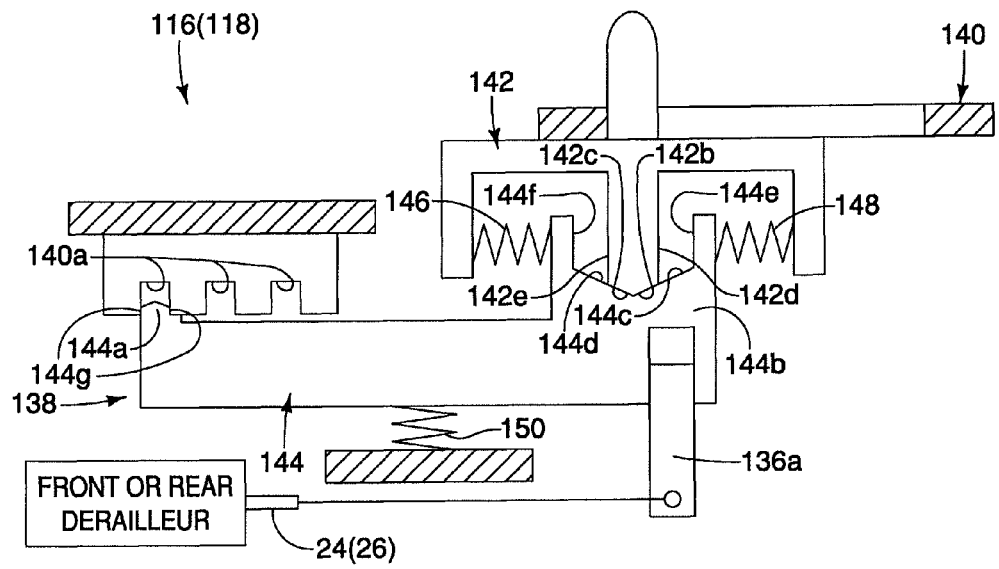
FIG. 14 is a simplified schematic view of the bicycle component positioning device in a rest (innermost) position where the bicycle component positioning device is incorporated into a shifter (a bicycle component operating device) and in which the positioning member is engaged with a first detent.
Figure 19:
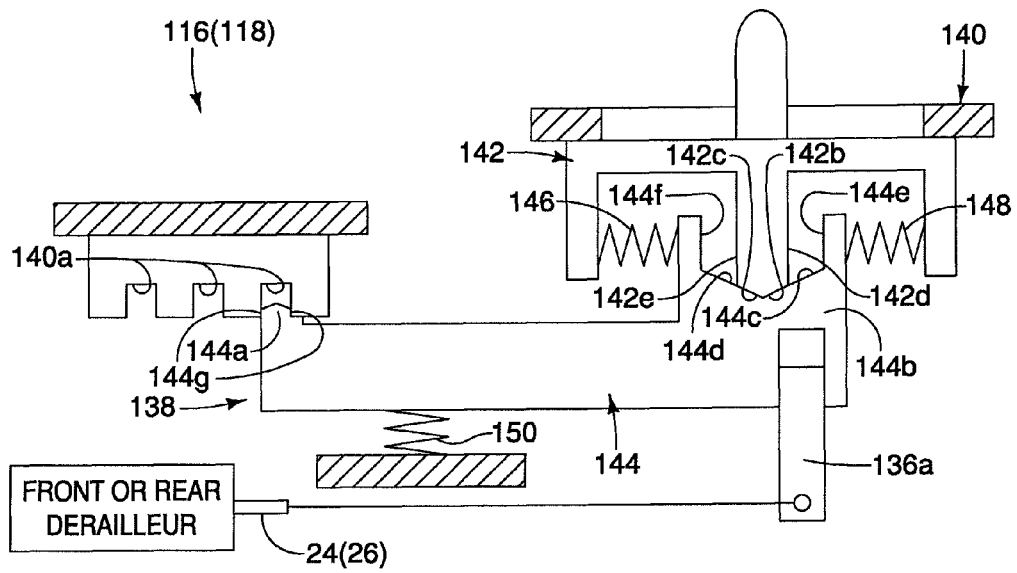
FIG. 19 is a simplified schematic view of the bicycle component positioning device illustrated in FIGS. 14 to 18, but in a rest (outermost) position in which the positioning member is engaged with a third detent.

Thus, the first and third contact surfaces 142b and 142d are arranged to contact the positioning member with the first contact surface 142b initially moving the positioning member 144 in the third direction C and the third contact surface subsequently moving the positioning member 144 in the first curved direction A in response to the first progressive movement of the input member 144 in the first curved direction A, as seen in FIGS. 14 to 16. In FIG. 15, the positioning member 144 is moved in both of the first and third directions A and C by the first contact surface 142b, but the positioning member 144 is initially moved in the third direction C due to engagement of the positioning member 144 against the fixed structure 140 as explained below. The second and fourth contact surfaces 142c and 142e are arranged to contact the positioning member 144 with the second contact surface 142c initially moving the positioning member 144 in the third direction C and the fourth contact surface 142e subsequently moving the positioning member 144 in the second curved direction B in response to the second progressive movement of the input member 142 in the second curved direction B, as seen in FIGS. 19 to 21. In FIG. 20, the positioning member 144 is moved in both of the second and third directions B and C by the second contact surface 142c, but the positioning member 144 is initially moved in the third direction C due to engagement of the positioning member 144 against the fixed structure 140 as explained below.

The input member 142 is biased to a center rest position with respect to the positioning member 144 such that the input member 142 is movable in both of the first and second curved directions A and B from the rest position. In particular, the biasing members 146 and 148 are arranged between the input member 142 and the positioning member 144 to normally maintain the input member 142 in a rest position. While the biasing members 146 and 148 are illustrated as coiled compression springs, it will be apparent to those skilled in the art from this disclosure that other biasing arrangements can be utilized if needed and/or desired.

The positioning member 144 is operatively coupled to the input member 142 to selectively move between a plurality of predetermined positions in response to movement of the input member 142. In particular, the positioning member 144 includes a movement restricting part 144a and an input transmitting part 144b. The movement restricting part 144a of the positioning member 144 selectively engages the positioning detents 140a to restrict movement of the positioning member 144 in both the first and second moving directions A and B when the input member 142 is the rest position without a force being applied to the input member 142. The movement restricting part 144a of the positioning member 144 is normally biased into engagement with one of the positioning detents 140a by the biasing member 150.

The input transmitting part 144b of the positioning member 144 cooperates with the contact surfaces 142b, 142c, 142d and 142e of the input member 142 and the fixed structure 140 so the positioning member 144 moves in response to movement of the input member 142. In particular, the input transmitting part 144b includes a first cam surface 144c, a second cam surface 144d, a first abutment surface 144e, a second abutment surface 144f and a pair of inclined surfaces 144g. The first cam surface 144c extends in the first curved direction A from a resting point. The second cam surface 144d extends in the second curved direction B from the resting point. The first abutment surface 144e faces in the second curved direction B. The second abutment surface 144f faces in the first curved direction A. The inclined surfaces 144g are formed on the free end of the movement restricting part 144a.

Figure 17:
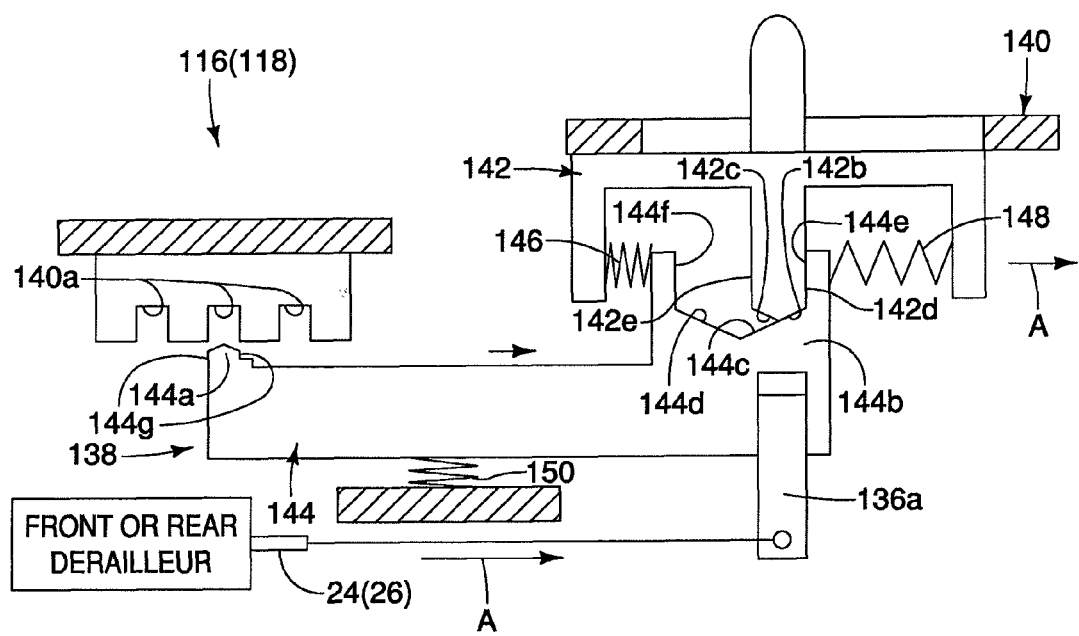
FIG. 17 is a simplified schematic view of the bicycle component positioning device illustrated in FIGS. 14 to 16, but with the input member being pushed (shifted in the first moving direction) further from the intermediate or partially shifted position of FIG. 16 to an end position such that the positioning member is located at a second detent.
Figure 18:
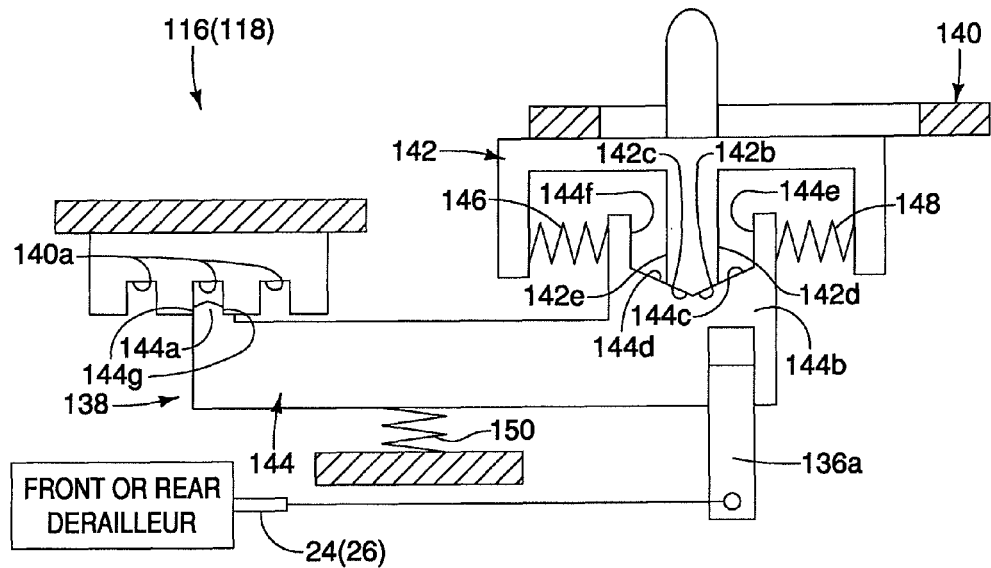
FIG. 18 is a simplified schematic view of the bicycle component positioning device illustrated in FIGS. 14 to 17, but with the input member being released so that the input member returns to a rest (middle) position and the positioning member engages the second detent.
Figure 22:
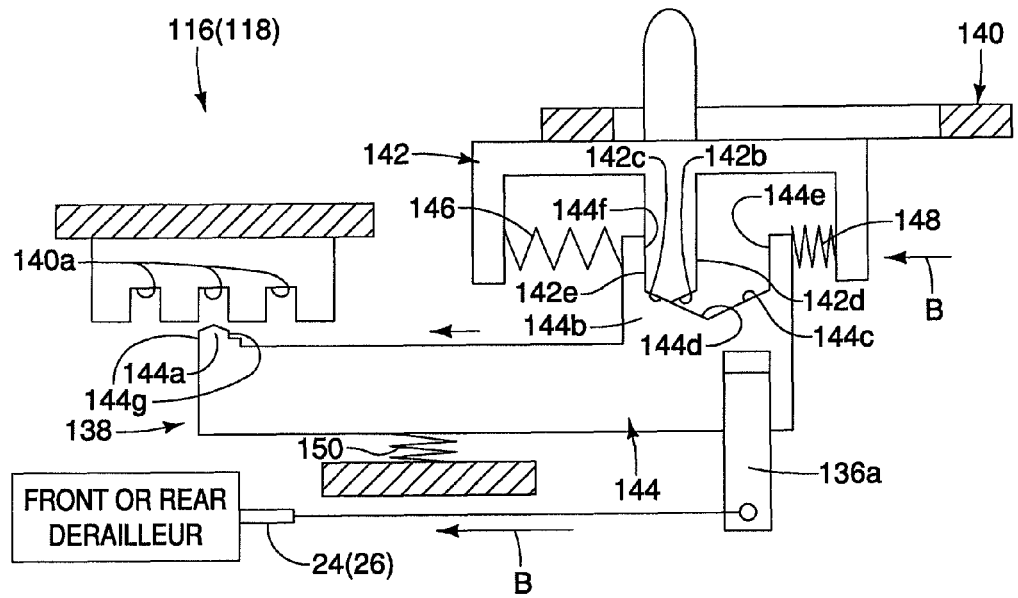
FIG. 22 is a simplified schematic view of the bicycle component positioning device illustrated in FIGS. 14 to 21, but with the input member being pulled (shifted in the second moving direction) further from the intermediate or partially shifted position of FIG. 21 to an end position such that the positioning member is located at the second detent.
Figure 23:
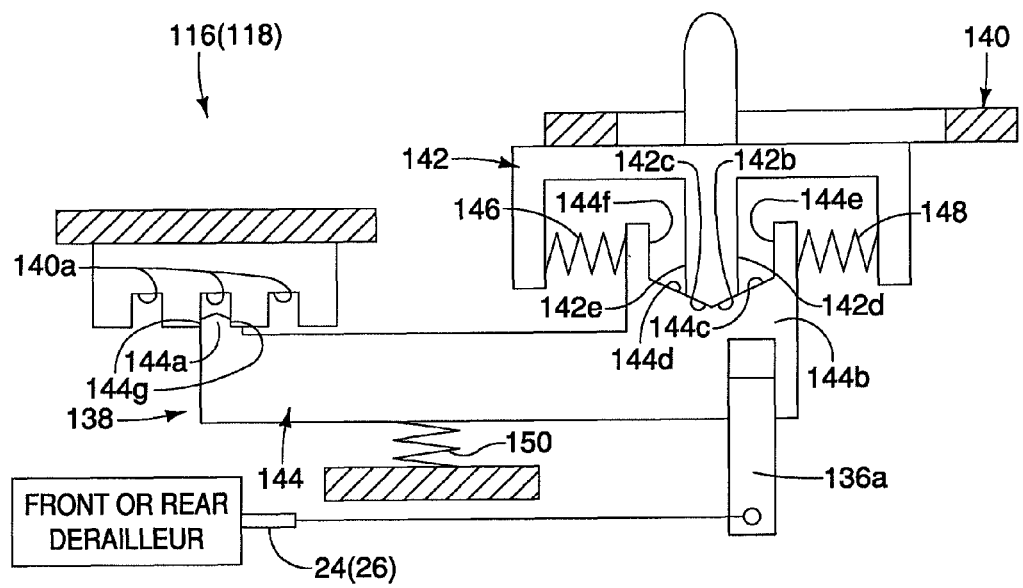
FIG. 23 is a simplified schematic view of the bicycle component positioning device illustrated in FIGS. 14 to 22, but with the input member being released so that the input member returns to a rest (middle) position and the positioning member engages the second detent.

As seen in FIG. 15, the positioning member 144 is moved in both of the first and third directions A and C. The first contact surface 142b of the input member 142 contacts the first cam surface 144c of the positioning member 144 and one of the inclined surfaces 144g contacts the fixed structure 140 to initially move the positioning member 144 in the third direction C. Then the third contact surface 142d subsequently contacts the first abutment surface 144e of the positioning member 144 to move in the first curved direction A in response to the first progressive movement of the input member 142 in the first curved direction A as seen in FIGS. 16 and 17. As seen in FIG. 20, the second contact surface 142c of the input member 142 contacts the second cam surface 144d of the positioning member 144 and one of the inclined surfaces 144g contacts the fixed structure 140 to initially move the positioning member 144 in the third direction C. Then the fourth contact surface 142e subsequently contacts the second abutment surface 144f of the positioning member 144 to move in the second curved direction B in response to the second progressive movement of the input member 142 in the second curved direction B as seen in FIGS. 21 and 22.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. For example, while the input members 42 and 142 are illustrated as being member coupled to a single lever type shifter, it will be apparent to those skilled in the art from this disclosure that each of the input members 42 and 142 could be constructed as two separate portions that are independently moveable in the first and second moving directions A and B, respectively. Thus, the term "input member" should be interpreted as including a single piece moveable in the first and second moving directions A and B as well as two or more separate pieces that are independently moveable. As used herein to describe the present invention, the following directional terms "forward, rearward, above, downward, vertical, horizontal, below and transverse" as well as any other similar directional terms refer to those directions of a bicycle equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component positioning device comprising:
    a fixed structure;
    an input member movably coupled relative to the fixed structure, the input member having a first moving direction and a second moving direction; and
    a positioning member operatively coupled to the input member to selectively move between a plurality of predetermined positions,
    the input member and the positioning member being configured and arranged relative to each other such that the positioning member is initially moved by the input member in a third direction different from the first and second moving directions in response to movement of the input member both in the first moving direction and in the second moving direction, the positioning member being initially moved in the third direction before movement of the positioning member in the first moving direction and before movement of the positioning member in the second moving direction,
    with the input member applying a continuous force against the positioning member during movement in the first and second directions such that the input member and the positioning member move in concert in both the first and second directions and remain in contact during movement in the first and second directions, the input member and the positioning member having relative movement in the first and second directions with respect to each other.

2. The bicycle component positioning device according to claim 1, wherein
the input member is operable by a separate operating device.

3. The bicycle component positioning device according to claim 1, wherein
the input member is a user operating member.

4. The bicycle component positioning device according to claim 1, wherein
the input member is biased to a center rest position with respect to the positioning member such that the input member is movable in both of the first and second moving direction from the rest position.

5. The bicycle component positioning device according to claim 1, further comprising
an output member operatively coupled to the positioning member to move in response to movement of the positioning member.

6. The bicycle component positioning device according to claim 5, wherein
the output member includes a chain guide.

7. The bicycle component positioning device according to claim 5, wherein
the output member includes a derailleur operating member.

8. The bicycle component positioning device according to claim 1, further comprising
biasing members arranged between the input member and the positioning member to bias the input member and the positioning member in the first and second directions.

9. A bicycle component positioning device comprising:
a fixed structure;
an input member movably coupled relative to the fixed structure, the input member having a first moving direction and a second moving direction; and
a positioning member operatively coupled to the input member to selectively move between a plurality of predetermined positions,
the input member and the positioning member being configured and arranged relative to each other such that the positioning member is initially moved by the input member in a third direction different from the first and second moving directions in response to movement of the input member both in the first moving direction and in the second moving direction, the positioning member being initially moved in the third direction before movement of the positioning member in the first moving direction and before movement of the positioning member in the second moving direction, the input member and the positioning member having relative movement in the first and second directions with respect to each other,
the fixed structure including a plurality of positioning detents that selectively engages a movement restricting part of the positioning member to restrict movement of the positioning member in both the first and second moving directions when the input member is in the rest position.

10. The bicycle component positioning device according to claim 9, wherein
the movement restricting part of the positioning member is normally biased into engagement with one of the positioning detents.

11. A bicycle component positioning device comprising:
a fixed structure;
an input member movably coupled relative to the fixed structure, the input member having a first moving direction and a second moving direction; and
a positioning member operatively coupled to the input member to selectively move between a plurality of predetermined positions,
the input member and the positioning member being configured and arranged relative to each other such that the positioning member is initially moved by the input member in a third direction different from the first and second moving directions in response to movement of the input member both in the first moving direction and in the second moving direction,
the positioning member including an input transmitting part with a first cam surface extending in the first moving direction from a resting point, a second cam surface extending in the second moving direction from the resting point, a first abutment surface facing in the second moving direction and a second abutment surface facing in the first moving direction,
the input member being arranged to contact the first cam surface of the positioning member to initially move the positioning member in the third direction, and then subsequently contact the first abutment surface of the positioning member to move in the first moving direction in response to a first progressive movement of the input member in the first moving direction, and
the input member being further arranged to contact the second cam surface of the positioning member to initially move the positioning member in the third direction, and then subsequently contact the second abutment surface of the positioning member to move in the second moving direction in response to a second progressive movement of the input member in the second moving direction.

12. A bicycle component positioning device comprising:
a fixed structure;
an input member movably coupled relative to the fixed structure, the input member having a first moving direction and a second moving direction; and
a positioning member operatively coupled to the input member to selectively move between a plurality of predetermined positions,
the input member and the positioning member being configured and arranged relative to each other such that the positioning member is initially moved by the input member in a third direction different from the first and second moving directions in response to movement of the input member both in the first moving direction and in the second moving direction,
the input member including a first contact surface, a second contact surface, a third contact surface and a fourth contact surface, the first and third contact surfaces being arranged to contact the positioning member with the first contact surface initially moving the positioning member in the third direction and the third contact surface subsequently moving the positioning member in the first moving direction in response to a first progressive movement of the input member in the first moving direction, and
the second and fourth contact surfaces being arranged to contact the positioning member with the second contact surface initially moving the positioning member in the third direction and the fourth contact surface subsequently moving the positioning member in the second moving direction in response to a second progressive movement of the input member in the second moving direction.

13. A bicycle derailleur comprising:

a base member attachable to a bicycle frame;

a movable member supporting a chain guide;

a linkage mechanism arranged between the base member and the movable member so that the chain guide moves laterally relative to the base member; and a positioning device for positioning the chain guide in one of a plurality of operating positions, the positioning device having an input member to move in a first moving direction and in a second moving direction, and a positioning member operatively coupled to the input member to selectively move between a plurality of predetermined positions, the movable member being operatively coupled to the positioning member to move in response to movement of the positioning member, the input member and the positioning member being configured and arranged relative to each other such that the positioning member moves in a third direction different from the first and second moving directions in response to a movement of the input member in both the first and the second moving direction, the positioning member being initially moved in the third direction before movement of the positioning member in the first moving direction and before movement of the positioning member in the second moving direction, with the input member applying a continuous force against the positioning member during movement in the first and second directions such that the input member and the positioning member move in concert in both the first and second directions and remain in contact during movement in the first and second directions, the input member and the positioning member having relative movement in the first and second directions with respect to each other.

* * * * *